(12) United States Patent
Costanzo et al.

(10) Patent No.: US 9,395,764 B2
(45) Date of Patent: Jul. 19, 2016

(54) GESTURAL MOTION AND SPEECH INTERFACE CONTROL METHOD FOR 3D AUDIO-VIDEO-DATA NAVIGATION ON HANDHELD DEVICES

(71) Applicants: Filippo Costanzo, Los Angeles, CA (US); Fernando Tornisiello, Rome (IT); Roberto Buttafarro, Turin (IT); Fabrizio Funto, Rome (IT)

(72) Inventors: Filippo Costanzo, Los Angeles, CA (US); Fernando Tornisiello, Rome (IT); Roberto Buttafarro, Turin (IT); Fabrizio Funto, Rome (IT)

(*) Notice: Subject to any disclaimer, the term of this patent is extended or adjusted under 35 U.S.C. 154(b) by 0 days.

(21) Appl. No.: 14/254,055

(22) Filed: Apr. 16, 2014

(65) Prior Publication Data

US 2014/0320394 A1  Oct. 30, 2014

Related U.S. Application Data

(60) Provisional application No. 61/815,753, filed on Apr. 25, 2013.

(51) Int. Cl.
*G06F 3/033* (2013.01)
*G06F 3/041* (2006.01)
*G10L 13/02* (2013.01)
*G06F 1/16* (2006.01)
*G06F 3/00* (2006.01)
*G06F 3/03* (2006.01)
*G06F 3/16* (2006.01)

(52) U.S. Cl.
CPC ............. *G06F 1/1694* (2013.01); *G06F 3/005* (2013.01); *G06F 3/0304* (2013.01); *G06F 3/167* (2013.01); *G06F 2203/0381* (2013.01)

(58) Field of Classification Search
CPC ... G06F 3/017; G06F 3/04815; G06F 3/0346; G06F 3/0482; G06F 3/041; G06F 3/0488; G06F 1/1626; G06T 17/00
USPC ................... 345/6, 156–173, 419, 679–680; 715/863; 463/31–32, 37
See application file for complete search history.

(56) References Cited

U.S. PATENT DOCUMENTS

| | | | |
|---|---|---|---|
| 2010/0053322 A1* | 3/2010 | Marti et al. | 348/135 |
| 2010/0138798 A1* | 6/2010 | Wilson | G06F 3/017 715/863 |
| 2010/0188328 A1* | 7/2010 | Dodge et al. | 345/156 |
| 2010/0241431 A1* | 9/2010 | Weng et al. | 704/257 |
| 2010/0275122 A1* | 10/2010 | Buxton et al. | 715/728 |
| 2011/0022393 A1* | 1/2011 | Waller et al. | 704/270 |
| 2012/0256959 A1* | 10/2012 | Ye et al. | 345/649 |
| 2012/0327112 A1* | 12/2012 | Aldunate et al. | 345/629 |
| 2013/0088419 A1* | 4/2013 | Kim et al. | 345/156 |
| 2013/0326425 A1* | 12/2013 | Forstall et al. | 715/851 |
| 2013/0335446 A1* | 12/2013 | Piippo et al. | 345/633 |
| 2014/0007115 A1* | 1/2014 | Lu et al. | 718/102 |
| 2014/0132505 A1* | 5/2014 | Vennelakanti et al. | 345/156 |

\* cited by examiner

*Primary Examiner* — Hong Zhou
(74) *Attorney, Agent, or Firm* — Clifford H. Kraft (57) ABSTRACT

A cognizant and adaptive method of informing a multi-modal navigation interface or a user's intent. This provides the user with the experience of exploring an immersive representation of the processed multimedia (audio-video-data) sources available that automatically adapts to her/his fruition preference. These results are obtained by first reconciling and aligning the User and the Device's frames of reference in tri-dimensional space and then dynamically and adaptively Smoothly Switching and/or combining both Gesture, Motion and Speech modalities. The direct consequence is a user experience that naturally adapts to the user choice of interaction and movement.

17 Claims, 6 Drawing Sheets

M1 NAVIGATION

STATIC - LOOKING UP    DISPLACED - MOVING FORWARD

GESTURAL INTERFACE

M1 NAVIGATION

STATIC - LOOKING UP   DISPLACED - MOVING FORWARD

FIG. 1

GESTURAL INTERFACE

M2 NAVIGATION

MOTION EXCLUSIVE

FIG. 2

M3 NAVIGATION

SPEECH EXCLUSIVE    STATIC - LOOKING UP    DISPLACED - MOVING FWD.

FIG. 3

M4 NAVIGATION

STATIC
LOOKING UP    DISPLACED - MOVING FWD.
GESTURAL INTERFACE

GESTURAL MOTION AND SPEECH INTERFACE CONTROL METHOD FOR 3D AUDIO-VIDEO-DATA NAVIGATION ON HANDHELD DEVICES

This application is related to and claims priority from U.S. Provisional Patent Application No. 61/815,753 filed Apr. 25, 2013. Application 61/815,753 is hereby incorporated by reference in its entirety.

BACKGROUND

1. Field of the Invention

The present invention relates generally to navigation on interactive handheld devices and more particularly to tools that implement a user's 3D navigation experience capable of displaying an interactive rendition of 2D and/or 3D audio-visual data accessed by the device locally and/or streamed via remote systems.

2. Description of the Prior Art

Gestural interfaces have become increasedly present in the market during the last few years. Consumer electronics manufacturers such as Nintendo, Apple, Nokia, LG, and Microsoft have all released products that are controlled using interactive gestures. Many of them utilize the motion of the human body or those of handheld controllers to drive users' interaction with videogames, television menu's control and the like.

Most current videogame interfaces on mobile devices like smart phones and tablets already use touch gestures to allow players to execute movements in space or choose actions or commands that are then reflected on-screen. Other categories of hardware devices in the videogames market incorporate gesture driven interfaces such as game consoles like Microsoft xBox™ 360 which use specific hardware (kinect) capable of reading user body motion and/or posture or tracking gesture sequences through a sophisticated implementation of image recognition techniques and augmented (3D depth) camera acquisition. Newer devices, like the Leap Motion Controller generalize some of the motion-tracking paradigm while bringing it out of the videogames domain and into the everyday desktop applications (apps).

Panoramic Imagery Navigation applications, like Google Street View, have incorporated both paradigms of motion and gesture—used alternatively to explore geo-referenced street panoramas.

Speech commands are commonly used in standard applications such as Siri™ (for Apple devices), or Loquendo™ (for PC programs), or the Microsoft Inquisit™ speech recognition engine. When the user speaks a command, the speech recognition system is activated detecting the phonetics and performing the required action. These speech recognition systems usually must be trained to the user's voice.

It would be extremely advantageous to have a system that could take full advantage of the gestural and motion capabilities available to a device using onboard sensors in concert with buttons displayed on the device screen that provides complete navigational capabilities.

SUMMARY OF THE INVENTION

The present invention creates a cognizant and adaptive method of informing a multi-modal navigation interface or a user's intent. This provides the user with the experience of exploring an immersive representation of the processed multimedia (audio-video-data) sources available that automatically adapts to her/his fruition preference. Such sources may include any combination of:

- 3D Computer Generated Simulations or Games.
- Speech Recognition Data.
- Surround Positional Audio sources. And Virtual Acoustic Environment data.
- Real World Positional Data (GPS-A-GPS-GLONASS-GNSS-Local/Indoor GPS-CELL ID-Location Pattern Matching LPM-wireless positioning, radio-based and the like.)
- Geo-referenced data and 3D geo-referenced databases.
- Augmented Reality reference frames, markers, and miscellaneous data.
- On-board camera data (Device's own or attached hardware); applied to: tracking, positioning, image processing.
- Device's on-board (or attached hardware) positioning and attitude sensors like: accelerometer, magnetometer, gyroscope etc.
- External local or remote positioning data sources.
- 2D-2½ D Panoramic Imaging and Video and relative camera data.
- 3D Computer Reconstruction from Imaging sources captured via:
    - Multiple cameras interpolation and 3D interpretation.
    - Hybrid Multiple cameras and Depth Capture systems 3D reconstruction.
- Stereoscopic viewing data.
- Time coding information relative to multimedia and data sources.

A specific example is given here demonstrating the navigation capabilities of the present invention; the example was developed for Apple iPad™ device. The concepts presented here can easily be transferred to other environments. Such environments may include various types of mobile devices such as smartphones and tablets as well as other similar cases of gestural, motion and speech sensing, enabled hardware.

Possible embodiments include the navigation of tri-dimensional virtual worlds like computer graphic simulations or videogames through the combined use of gesture, motion and speech modes on a mobile device. This provides the user with a navigation experience that is cognizant of the device Positioning, Heading and Attitude (orientation relative to a frame of reference: Cartesian, spherical etc.).

These results are obtained by first reconciling and aligning the User and the Device's frames of reference in tri-dimensional space and then dynamically and adaptively Smoothly Switching and/or combining both Gesture, Motion and Speech modalities. The direct consequence is a user experience that naturally adapts to the user choice of interaction and movement.

As an example, using a tablet (like the Apple iPad™ or similar products on the market today) to experience a videogame, the present invention allows the player to alternatively or collaboratively apply Gesture, Speech and Motion modalities. While sitting on a sofa, for instance, the player may prefer to delegate all navigation actions to the Gesture Interface (for example a touch screen interaction in case of the Apple iPad™) but a sudden "call to action" in the flow of the game, or an audible stimulus (3D audio localization performed by the application) can create the need of an abrupt change of point of view and/or position in the virtual world. This can more efficiently be achieved by letting the player's natural movement (as detected by the Motion Interface) intervene in the simulation, and either collaborate with the Gesture Interface or, in some cases, take control of the navigation system altogether.

DESCRIPTION OF THE FIGURES

Several drawings are presented to illustrate features of the present invention.

Drawings and illustrations have been presented to aid in understanding the present invention. The scope of the present invention is not limited to what is shown in the figures.

DETAILED DESCRIPTION OF THE INVENTION

The present invention relates to a system and method for combining and smoothly switching between gestural, motion and speech control of a handheld device.

The desired level of interaction described in the present invention is obtained by means of an advanced gesture interface system that performs the following tasks:

Calibrates the Device World Coordinates and Frame of Reference.

Calculates the relevant multi-dimensional data (space, time, elements characteristics and the like) derived from the processed sources.

Detects the presence of Gesture actions.

Detects the presence of Motion actions.

Detects the presence of Speech actions.

Detects the Device relative to dynamically changing Heading, Position and Attitude.

Determines whether in each of the Navigation Classes there should be a "prevalence" of a chosen modality.

Interprets the User's Input: Gesture, Motion and Speech to determine the appropriate tri-dimensional changes and actions (which can take place as 3D Space and/or Time displacement).

Performs all the necessary adjustment and re-alignments to the Device World Frame of Reference to allow for a dynamic smooth switching among the different possible modalities.

The elements being described here can be performed on audio-video-data sources obtained via the methods known in the art. Such sources might be available offline to be pre-processed and/or can be streamed and interpreted in real-time by the server and/or the client.

Definitions

"Data Sources" are sources of 2D or 3D audio-video.
"World" is a multi-dimensional representation of audio-video-data sources that can manifest as:

Computer Generated (CG): 3D Videogames, Virtual Simulations.

Real World: 2D-2½ D Panoramic Imaging and/or Video, 3D reconstruction from various methods.

Merged: Real and CG combined World for: Augmented Reality, Mixed Realities and the like.

"User" is a single or multiple entity, human or computer, locally or remotely interacting with the Device.

"Virtual User" is a single or multiple representation of the User in the World.

"Device" is a single or multiple handheld hardware device capable of one or any combination of: displaying, receiving, recording and processing multimedia sources as well as receiving direct or remote input from User or local or remote device and/or computer system.

"Device Vector" is the vector defined by the device Heading, Position and Attitude.

"Device Window" is a single or multiple instance of the device Viewing Frustum as determined by virtual (CG World) or real (Real World) camera lens data and by the Device detection and programming of its own (or attached) hardware camera parameters.

"Gesture Interface" This is the category of interactions performed by the user/s gestures (touch-motion-expression) with the hardware available on board and/or attached to the device. Examples include: touch screens, gesture detection or user/s body motion via additional devices like Leap Motion etc. or face expression detection via on-board camera or additional devices.

"Motion Interface" This is the category of interactions, performed by the user/s while moving in free space and holding the device, detected by the hardware available on-board and/or attached/connected to the device. Examples include motion tracking via: accelerometers, gyroscopes, magnetometers, GPS, camera tracking-image processing and other similar sensors. This is to determine, for example, the device heading, position and attitude while the user freely moves it up, down, left, right, back, forward and/or rotates it around its axes.

"Speech Interface" This is the category of interactions performed by the user/s via spoken language with the hardware available on board the device and/or attached/connected to the device along with speech recognition software.

The three modalities: Gesture, Motion and Speech Interfaces may act collaboratively permitting a Smooth Switching among their possible combination and variations.

The relative and absolute localization data about the device is determined by the vector (Device Vector) defined by its Heading, Position and Attitude information provided by the device's onboard and/or attached sensors (calculated from the raw sensor inputs).

Gesture, Motion and Speech Interfaces utilize user input as detected and classified in two principal Navigation Classes: Static and Displaced.

Static

The Static Navigation Class represents all the types of motions of the Device Vector that do not significantly alter its Position parameters (depending on frame of reference). Examples may include: look around in all directions, tilt up or down (all without lateral displacement).

Displaced

The Displaced Navigation Class represents all the types of motions of the Device Vector that significantly alter its Position parameters (depending on frame of reference). Examples may include: moving forward, back, left, right, up, down.

Users can switch from a pure Gestural use of the interface by performing relevant Motions or Speech (Static or Displaced—as rendered available by the system). Relevant Motions are motions of the Device Vector possibly determined by respective user movements (captured by the Device sensors) that exceed a programmed and user changeable threshold.

In a possible embodiment, the user can explore a given virtual world with the combined use of Gestures, Motion and Speech Interfaces of which we now give examples of as follows:

Gesture Interface
Gesture Interface (left or right fingers)—Look Around (Static Class)
Up-Down-Left-Right
Gesture Interface (left or right fingers)—Move (Displaced Class)
Walk-Run-Jump-Fly-Duck|Back-Forth-Left-Right A typical example may be through the use of virtual buttons on a touch screen or a joystick (virtual or real). The user manipulates that buttons with the fingers to change the view toward the left or right, or up or down in the static class. In the dynamic class, the user again manipulates the fingers cause scene being viewed to displace its viewing location. The user, while really at a fixed location, causes the scene to appear so that the user has the impression that he or she is walking, running flying or the like.

Motion Interface
User Moves the Device in all Directions (Static Class)
Pivot around position in 360 degrees Here the user actually moves the device in its physical space (usually by holding the device and changing its orientation. The viewed scene follows the motions of the user. Hence, if the user was holding the device pointing horizontally, and then lifts it upward over his head, the scene can go from showing what is in front horizontally to what is above. In the static class, the user does not change his coordinates in 3D space.

User Moves her/his Body in all Directions (Displaced Class)
Walk-Run-Jump-Fly-Duck|Back, Forth, Left, Right
Rotates around her/himself while standing and/or walking/running or the like. Here, the user changes his coordinates in physical space by waking, running or the like.

Speech Interface
Spoken Command—"Look Around" (Static Class)
"Look Up"-"Down"-"Left"-"Right"-"Look At"
Spoken Command—"Move" (Displaced Class)
'Walk"-"Run"-"Jump"-"Fly"-"Duck"|"Back"-"Forth"-"Left"-"Right"
"GoTo" spoken directions like:
   "Take me to":
   "Address"
   "Position in 3D space"
   "Relevant locations"

The speech interface can contain a large number of recognizable spoken commands that can be used in a way similar to the gestural commands, except spoken to move the scene in either the static or dynamic class.

Prevalence

To maintain order when the user is allowed to make any combination of gestural, motion or speech commands (or subsets of these), it is necessary to give the various interfaces priority values. These will be called prevalence. Prevalence is used to decide what to do when commands are received simultaneously on more than one of the interfaces. The preferred embodiment of the present invention uses the following prevalence:

1) Gesture based actions take prevalence over Motion and Speech.

2) Motion based actions can take place if a Static or Displaced Navigation Class is not being performed by the Gesture Interface.

3) Motion based action take prevalence over Speech.

This is one possible prevalence assignment. Other combinations are possible. Any choice of prevalence is within the scope of the present invention.

This Provides the User with Modal Variations Like (Shown in FIGS. 1-9):

M0—A calibration mode where no gestures, motions or speech commands are accepted.

Figure 1:
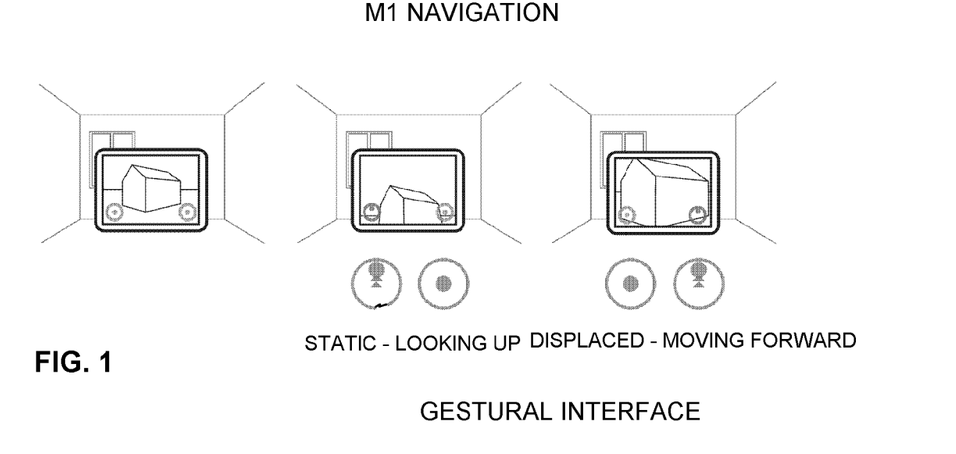
FIG. 1 shows control in mode M1; gestural exclusive.

M1—(Gestural Exclusive—All actions related to Navigation Classes are performed via Gestural Interface)
   Gestural Interface=Static
   Gestural Interface=Displaced
   Motion Interface=NULL
   Speech Interface=NULL The user typically uses finger manipulations to change what is displayed as shown in FIG. 1. The user can move the view to any direction, move in and out (zoom), or in the displaced class, cause the scene to simulate user motion in the 3D image space. In the Gestural exclusive mode, the physical device is not moved.

Figure 2:
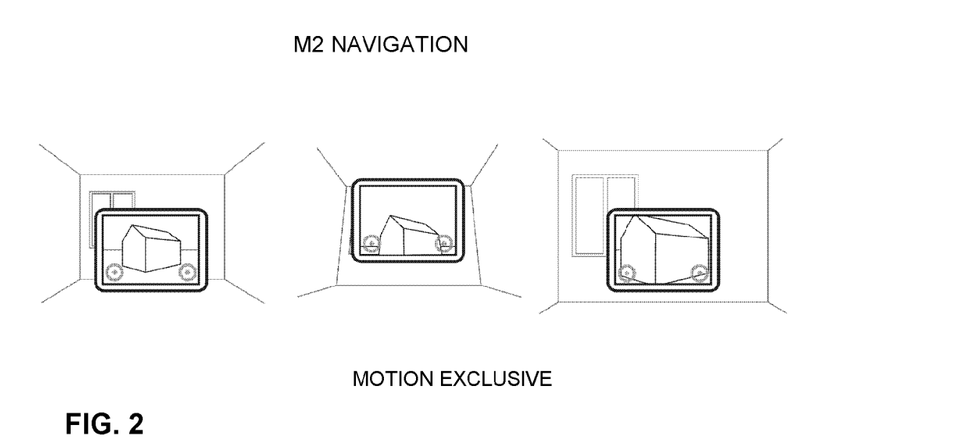
FIG. 2 shows control in mode M2; device motion exclusive.

M2—(Motion Exclusive—All actions are performed via user physical motions while holding the device)
   Gesture Interface=NULL
   Motion Interface=Static
   Motion Interface=Displaced
   Speech Interface=NULL Here the user totally controls the device by physically moving it as shown in FIG. 2. For example, in the displaced class, if the user holds the device in front of him and walks, the displayed scene moves accordingly as though the viewer were moving the cameral point of view in the scene.

Figure 3:
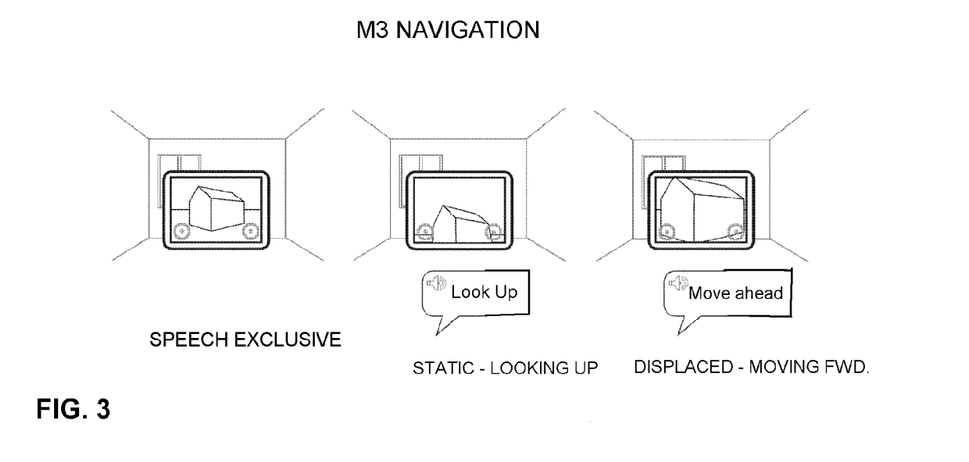
FIG. 3 shows control in mode M3; speech control exclusive.

M3—(Speech Exclusive—All actions are performed via spoken language)
   Gesture Interface=NULL
   Motion Interface=NULL
   Speech Interface=Static
   Speech Interface=Displaced Here static and displaced class commands are given exclusively by voice as shown in FIG. 3. Commands are decoded by speech recognition software/hardware from a library of possible commands.

Figure 4:
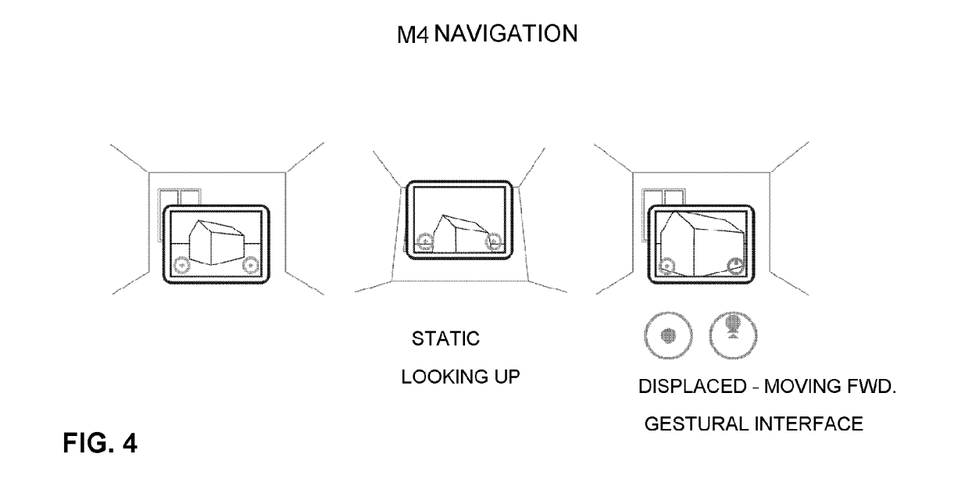
FIG. 4 shows control in mode M4; static motion, displaced gestural.

M4—(Static gestural, static motion—commands may be entered both by gestures and by static motion.
   Gesture Interface=Displaced
   Motion Interface=Static
   Speech Interface=NULL Here gestures can be used to control walking, running and the like with static motions used to determine the direction of view as shown in FIG. 4.

Figure 5:
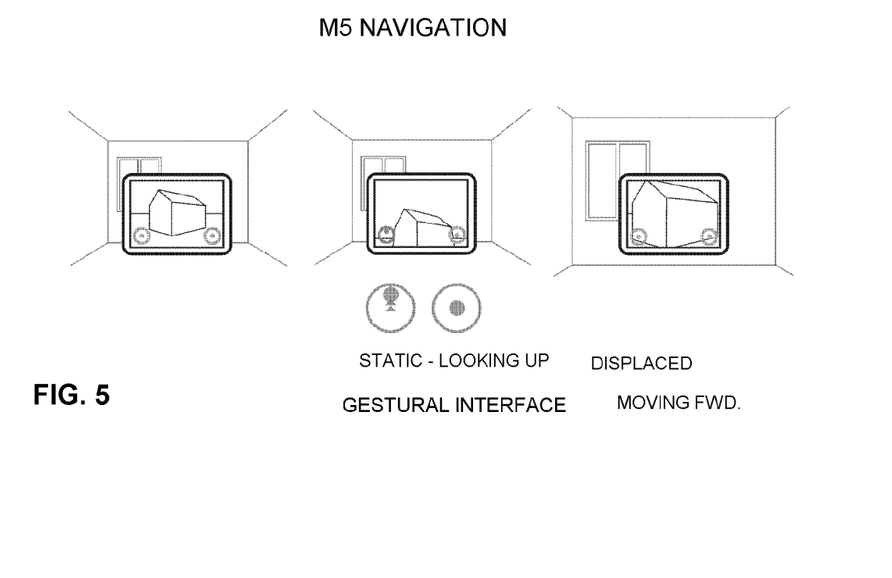
FIG. 5 shows control in mode M5; static gestural, displaced motion.

M5—(Static gestural, displaced motion—commands may be entered by both gesture and motion).
   Gesture Interface=Static
   Motion Interface=Displaced
   Speech Interface=NULL Here running, walking and the like are controlled by actually moving the device, while the direction of view is determined by gestures as shown in FIG. 5.

Figure 6:
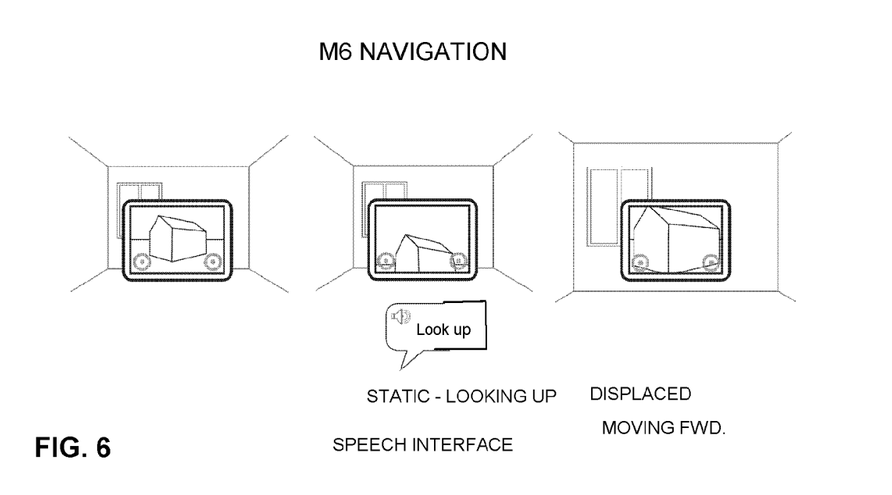
FIG. 6 shows control in mode M6; static speech, displaced motion.

M6—(Displaced motion, static speech—commands may be given by moving the device and speech).
   Gesture Interface=NULL
   Motion Interface=Displaced
   Speech Interface=Static Here, running, walking and the like are controlled by moving the device, while the direction of view is determined by speech command as shown in FIG. 6.

M7—(Static speech, displaced gestural—commands may be given both by gestures and speech).

Figure 7:
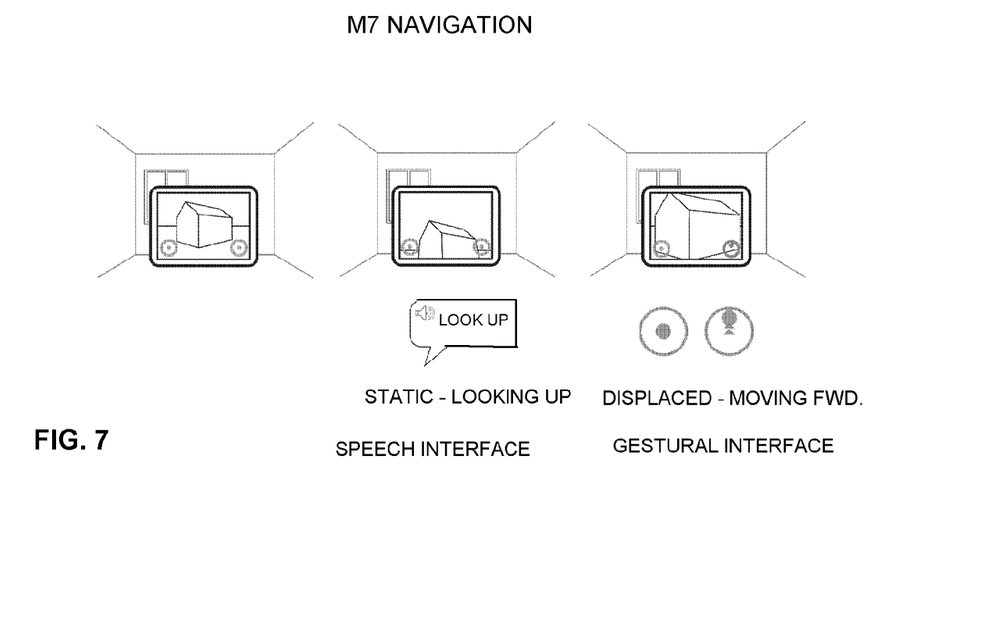
FIG. 7 shows control in mode M7; static speech, displaced gestural.

Gesture Interface=Displaced
    Motion Interface=NULL
    Speech Interface=Static Here gestures are used to control running, waking and the like, while speech commands determine the direction of view as shown in FIG. 7.

M8—(Static gestural, displaced speech—commands may be given by speech and by gestures).

Figure 8:
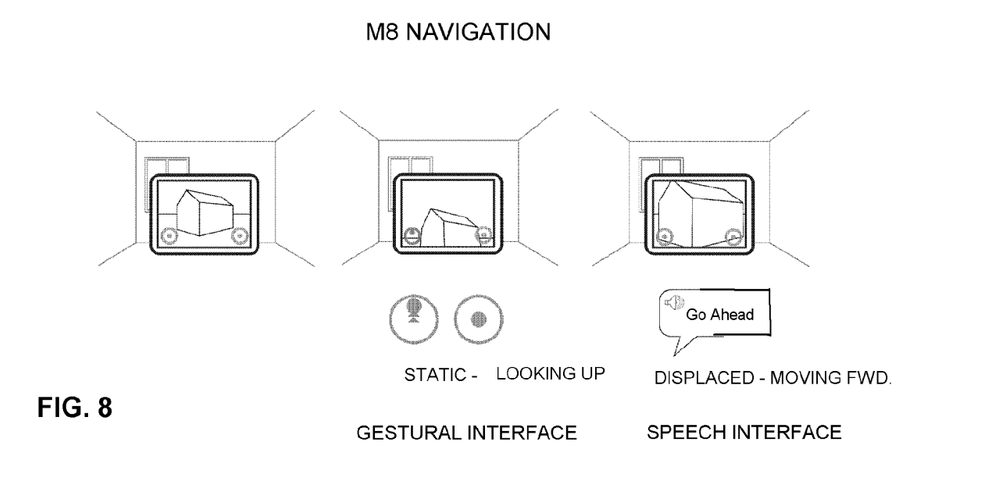
FIG. 8 shows control in mode M8; static gestural, displaced speech.

Gesture Interface=Static
    Motion Interface=NULL
    Speech Interface=Displaced Here, speech commands are used to determine running, walking and the like while gestures determine the direction of view as shown in FIG. 8.

M9—(Static motion, displace speech—commands may be given by motion and speech).

Figure 9:
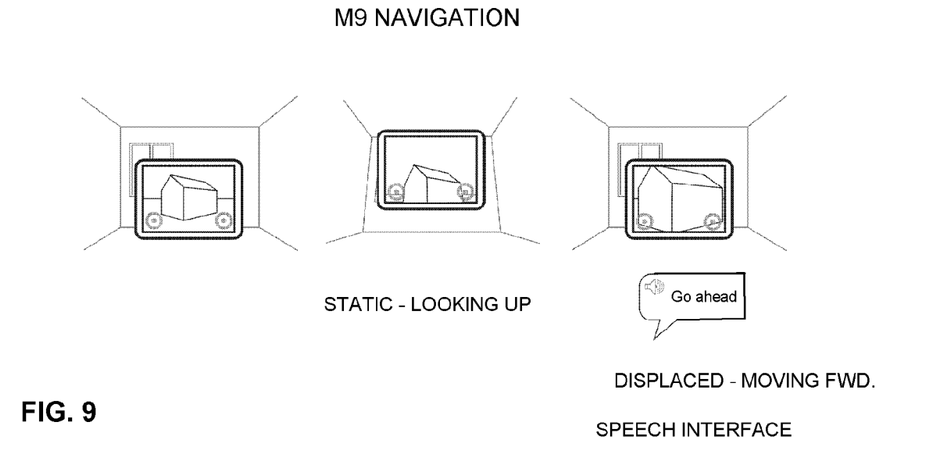
FIG. 9 shows control in mode M9; static motion, displaced speech.

Gesture Interface=NULL
    Motion Interface=Static
    Speech Interface=Displaced Here, speech commands control running, walking and the like, while motions control the direction of view as shown in FIG. 9.

As previously stated, when multiple interfaces are used for control, order is maintained through the use of prevalence. Here are some examples of prevalence:

Mode M4—Static gestural, static motion.

The user uses the Gesture Interface to alter her/his position through the World while, at the same time, uses the Motion Interface (pointing the device towards the desired direction) to determine her/his orientation in 3D space.

Mode M5—Static gestural, displaced motion.

The user uses the Motion Interface to alter her/his position through the World while, at the same time, uses the Gesture Interface (for example using a touch screen interaction) to determine her/his orientation in 3D space.

M8—Static gestural, displaced speech.

The user uses the Speech Interface to alter her/his position through the World while, at the same time, uses the Gesture Interface (for example using a touch screen interaction) to determine her/his orientation in 3D space.

The present invention provides a Smooth and Adaptive Automatic Switching among these modalities. The method provides the user with a reasonably seamless transition between situations where the interaction changes (in one of the two navigation classes [static-displaced]) from Gesture or Speech to Motion. All the while, the system monitors changes in user interaction and the device's relative position and attitude and provides a real-time dynamic adaptation to the world's (relative or absolute) coordinates returning (smoothly switching) the Static or Displaced Class control to the Gesture, Speech and Motion's Interfaces respectively.

Figure 10:
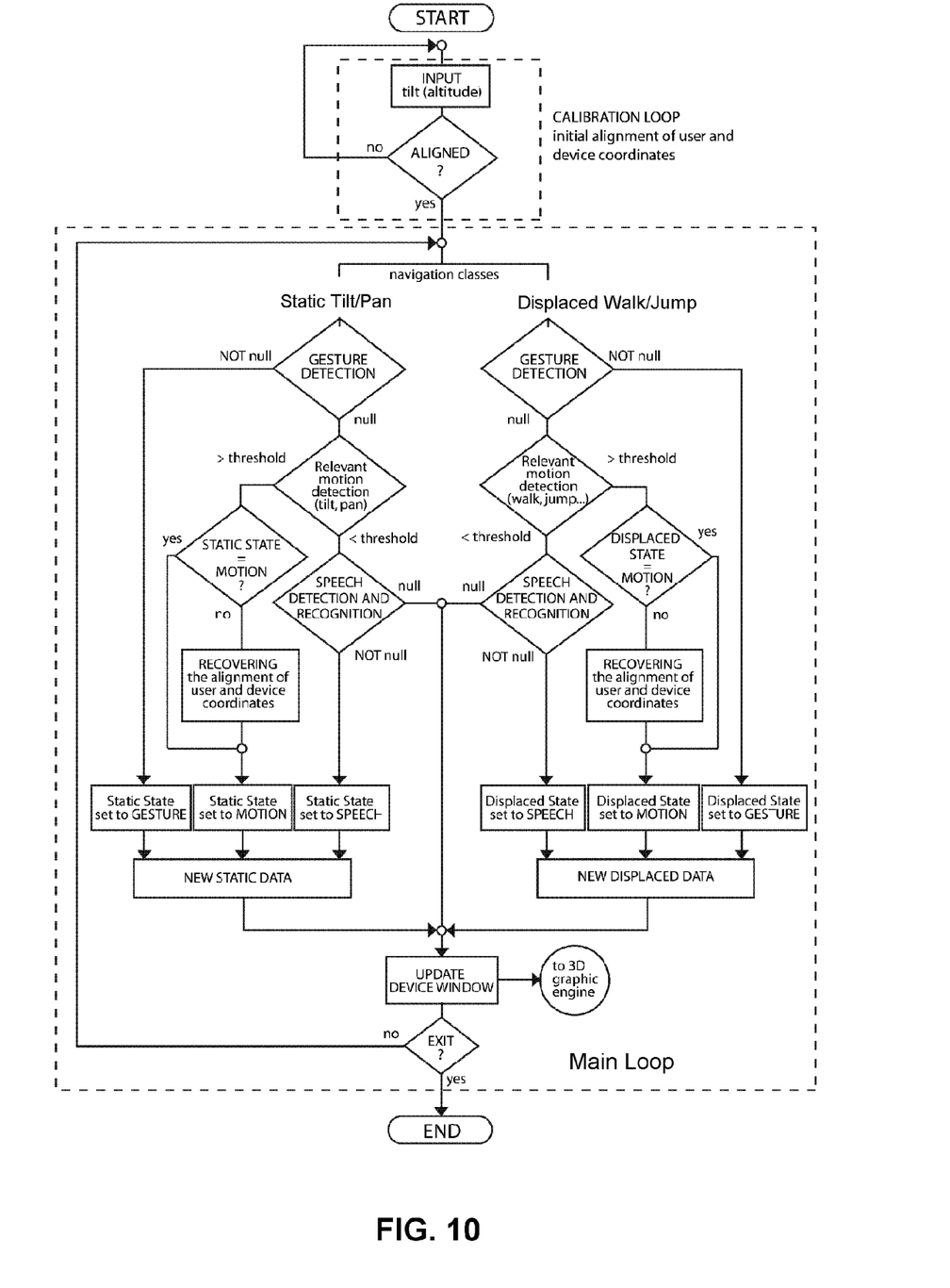
FIG. 10 shows a process flow graph.

The following steps are used to achieve the smooth and adaptive automatic switching as shown in FIG. 10

Calibration

The purpose of this process is to perform a first alignment of Device and World's Coordinates and respective Frames of Reference in the following scenarios:

Computer Generated (Videogames—3D simulations)
    Real World (Google StreetView like navigation)
    Merged (Augmented Reality applications)

According to FIG. 10, the tilt, or device position, is aligned to user coordinates.

According to FIG. 10, after calibration, static and displaced states are processed on the left and right of the diagram. According to prevalence, as previously described, gestures are first processed, then motion and finally speech commands. If there is an active gesture, motion and speech are ignored during that gesture. If there is no active gesture, the system looks for a motion that exceeds a predetermined threshold. If there is an active motion, speech is ignored. Finally, if there are no active gestures and no active motion, any speech commands are processed. The system loops endlessly to accept new commands.

Sample pseudo code has been supplied to illustrate a possible embodiment of the present invention on a device that allows gestures, contains motion sensors, and can receive and process speech commands.

Embodiments, however, may be embodied in many different forms and should not be construed as being limited to the embodiment set forth herein. Rather, this preferred embodiment is provided so that this disclosure will be thorough and complete, and will fully convey the scope to those skilled in the art. As used herein, the term "and/or" includes any and all combinations of one or more of the associated listed items. It will be understood that although the terms first, second, third, etc., may be used herein to describe various elements, components, Classes or methods, these elements, components, Classes or methods should not be limited by these terms. These terms are only used to distinguish one elements, components, Classes or methods from another element, component, Class or method.

Several descriptions and illustrations have been provided to aid in understanding the present invention. One with skill in the art will understand that numerous changes and variations may be made without departing from the spirit of the invention. Each of these changes and variations is within the scope of the present invention.

Processing

Note:

The present example follows the preferred embodiment and applies the Prevalence method as described above in the Prevalence paragraph. This does not exclude further embodiments that use a different Prevalence assignment.

```
//Process World
init WorldView;
init DeviceViewFrustum;
(Virtual World View is established [locally or remotely] and displayed on device)
//Process User Interaction
NavigationState=M0
init GestureInterface;
init MotionInterface;
init SpeechInterface;
init StaticNavigationClass;
init DisplacedNavigationClass;
init DetectionThreshold; //(Sensor threshold of intervention)
init StaticNavigationState=NULL;
init DisplacedNavigationState=NULL;
init GestureNavigationState=NULL;
init Motion NavigationState=NULL;
init Speech NavigationState=NULL;
```

//Sensors on the devices are continuously queried. Each of the possible input is associated with a set of actions that correspond to the Navigation Classes as explained above on page 8

Main get NavigationState
detect Userinteraction
//Detect User Interaction
The STATIC and DISPLACED navigation classes are queried simultaneously to check if each of the Gesture, Motion and Speech Interfaces (in order of priority) is using any of the available actions present in the two classes (see examples page 8).

```
for (NavigationClass = STATIC; DISPLACED)
    if GestureDetection ≠ NULL and DetectionThreshold ≠ NULL
    update GestureNavigationState (STATIC, DISPLACED)
    for (NavigationClass = STATIC; DISPLACED) = NULL
        if MotionDetection ≠ NULL and DetectionThreshold ≠
        NULL update MotionNavigationState
        (STATIC, DISPLACED)
        for (NavigationClass = STATIC; DISPLACED) = NULL
            if SpeechDetection ≠ NULL and
            DetectionThreshold ≠ NULL update
            SpeechNavigationState (STATIC, DISPLACED)
    then
```

//Update User Interaction State
   a. Static Class->Interface used (Gesture-Motion-Speech).
   b. Displaced Class->Interface used (Gesture-Motion-Speech).
   c. Calculation of new device vector.
Set NavigationState=M(0-9)
if NavigationState≠M0 then
NewNavigationState=TRUE
UpdateDeviceWindow
//Switch to Different Modalities
In the current example a Gesture Prevalence method is described, as a consequence Smooth Switching between different modalities is explained considering such prevalence. When a change is present and executed in the user fruition of the Classes and Interfaces (for instance going from a "gesture only" to one of the possible "gesture and motion" modalities), such change is detected and recorded in the updated user interaction.
When an action, previously performed in either the Static or the Displaced Classes using either the Gesture or Speech Interfaces instructions, is subsequently dynamically performed using the Motion interface, a new real-time query of the Device Position and Attitude continuously updates the Device Vector and a transition trajectory path is calculated from the last non-MotionInterface coordinates to the currently updated Device Vector.
To allow the method to give the user the sensation that it is "smoothly following" the change in the use of the interface, the process, when required, can perform a programmed animation of the transition trajectory from the point of switch (Gesture or Speech to Motion executed action) to its immediate destination in real-time (considering the device and eventual connection performance) finally adapting the device vector and window to the new request from the user.
get NavigationState
if NewNavigationState=TRUE
get STATIC and DISPLACED Interfaces States
   if in STATIC or DISPLACED Classes, Speech and/or Motion Interface based actions=NULL
    if GestureInterface actions 0 NULL
    compute GestureInterface instructions
    compute (animate) alignment to new position of DeviceViewFrustum
    UpdateDeviceWindow
   if in STATIC or DISPLACED Classes, Gesture and/or Motion Interface based actions=NULL
    if SpeechInterface actions 0 NULL
    compute SpeechInterface instructions
    compute (animate) alignment to new position of DeviceViewFrustum
    UpdateDeviceWindow
   if in STATIC or DISPLACED Classes, Gesture and/or Speech Interface based actions=NULL
    if MotionInterface actions # NULL
    compute MotionInterface Device Attitude Trajectory
    compute (animate) Trajectory Transition alignment to new position of DeviceViewFrustum
    UpdateDeviceWindow
UpdateUserInteractionState Several descriptions and illustrations have been presented to aid in understanding features of the present invention. One with skill in the art will realize that numerous changes and variations may be made without departing from the spirit of the invention. Each of these changes and variations is within the scope of the present invention.

We claim:

1. A system for navigation on a handheld device comprising:
    a gesture module that can receive gesture commands from a physical interface on the device or a remote rendering computer server by executing stored first computer instructions on a processor contained in the device
    a motion module that produces motion commands by detecting motion of the device in 3-dimensional space by executing second stored computer instructions on said processor that read and process data from motion sensors contained in the device;
    a speech module that can decode voice commands spoken through a microphone contained in the device by executing third stored computer instructions on said processor;
    a graphics driver adapted to display an image on a display screen attached to the device;
    data from each of said gesture module, said motion module and said speech module combined in a prevalence module that executes fourth stored computer instructions on said processor to prioritize a gesture command over a motion command, and prioritize a motion command over a speech command, said prevalence module adapted to issue an action command based on either a gesture, a motion of the device, or a speech command to said graphics driver to cause said graphics driver to modify the image on the display according to said gesture, motion or speech command; and,
    wherein said prevalence module transitions smoothly between gesture, motion and speech commands;
    and wherein the gesture, motion and speech commands include the following modalities: M1—static and displaced gesture commands; M2—static and displaced motion commands; and wherein the gesture, motion and speech commands include at least one of: M3—static and displaced speech commands; M4—displaced gesture commands and static motion commands; M5—static gesture commands and displaced motion commands; M6—displaced motion commands and static speech commands; M7—displaced gesture commands and static speech commands; M8—static gesture commands and displaced speech commands; and M9—static motion commands and displaced speech commands.

2. The system for navigation of claim 1 wherein said device is a telephone or tablet computer.

3. The system for navigation of claim 1 wherein said display is a touch screen and gestures are entered on virtual controls on said touch screen.

4. The system for navigation of claim 1 wherein said sensors include at least a motion sensing device.

5. The system for navigation of claim 1 wherein said first, second, third and fourth set of computer instructions are stored in a memory contained is said device or in a remote computer server.

6. The system for navigation of claim 1 wherein said motion module generates a motion command when a device motion parameter exceeds a predetermined value.

7. The system for navigation of claim 1 wherein said gesture commands, said motion commands and said speech commands each belong either to a static class or a displaced class, wherein commands belonging to the static class change view direction of said image with no change in displacement, and commands belonging to the displaced class change displacement of said image with no change in view direction.

8. The system for navigation of claim 7 configured to provide a user with a seamless transition between situations where interaction changes from gesture or speech commands to motion commands in either a static or a displaced class.

9. The system for navigation of claim 1 configured to provide a smooth and adaptive automatic switching among modalities M1, M2, M3, M4, M5, M6, M7, M8 and M9.

10. A method for image navigation on a handheld computer device having a touch screen, camera or joystick, a set of motion or geo-location sensors and a microphone driving a speech recognition sub-system, said device also having a 3D graphic engine on board or connected to a remote rendering device and a current device window relating to a displayed image, comprising:
- receiving a gesture command from said touch screen, camera or joystick, and/or;
- receiving a motion command from said motion sensors, and/or;
- receiving a speech command from said speech recognition sub-system;
- computing static class data from a static gesture command, if present; else computing static data from a static motion command, if present; else computing static data from a static speech command if present;
- computing displaced class data from a displaced gesture command, if present; else computing displaced class data from a displaced motion command, if present; else computing displaced data from a displaced speech command if present;
- determining locally or remotely an update for said current device window based on said static class data and said displaced class data;
- commanding the 3D graphic engine locally or remotely to perform said update to the current device window for said displayed image
- and wherein the gesture, motion and speech commands include the following modalities: static and displaced speech commands; displaced gesture commands and static motion commands; static gesture commands and displaced motion commands; displaced motion commands and static speech commands; displaced gesture commands and static speech commands; static gesture commands and displaced speech commands; and static motion commands and displaced speech commands.

11. The method of claim 10 further comprising providing a user with a seamless transition between situations where interaction changes from gesture or speech commands to motion commands in either a static or a displaced class.

12. A system for navigation on a handheld device comprising:
- a gesture module configured to receive gesture commands from a physical interface on the device;
- a motion module that produces motion commands by detecting motion of the device in 3-dimensional space configured to read and process data from motion sensors contained in the device;
- a speech module configured to decode voice commands spoken through a microphone contained in the device;
- a graphics driver adapted to display an image on a display screen attached to the device;
- data from each of said gesture module, said motion module and said speech module combined in a prevalence module that executes stored computer instructions on said processor to prioritize a gesture command over a motion command, and prioritize a motion command over a speech command, said prevalence module adapted to issue an action command based on either a gesture, a motion of the device, or a speech command to said graphics driver to cause said graphics driver to modify the image on the display according to said gesture, motion or speech command; and,
- wherein said prevalence module transitions smoothly between gesture, motion and speech commands;
- and wherein the gesture, motion and speech commands include the following modalities: M1—static and displaced gesture commands; M2—static and displaced motion commands; M3—static and displaced speech commands; M4—displaced gesture commands and static motion commands; M5—static gesture commands and displaced motion commands; M6—displaced motion commands and static speech commands; M7—displaced gesture commands and static speech commands; M8—static gesture commands and displaced speech commands; and M9—static motion commands and displaced speech commands.

13. The system for navigation of claim 12 wherein said device is a telephone or tablet computer.

14. The system for navigation of claim 12 wherein said display is a touch screen and gestures are entered on virtual controls on said touch screen.

15. The system for navigation of claim 12 wherein said sensors include at least a motion sensing device.

16. The system for navigation of claim 12 wherein said gesture commands, said motion commands and said speech commands each belong either to a static class or a displaced class, wherein commands belonging to the static class change view direction of said image with no change in displacement, and commands belonging to the displaced class change displacement of said image with no change in view direction.

17. The system for navigation of claim 12 configured to provide a smooth and adaptive automatic switching among modalities M1, M2, M3, M4, M5, M6, M7, M8 and M9.

* * * * *